(12) United States Patent
Lord et al.

(10) Patent No.: US 10,267,263 B2
(45) Date of Patent: Apr. 23, 2019

(54) EXHAUST DUCT FOR TURBINE FORWARD OF FAN

(71) Applicant: United Technologies Corporation, Farmington, CT (US)

(72) Inventors: Wesley K. Lord, South Glastonbury, CT (US); Jesse M. Chandler, South Windsor, CT (US); Gabriel L. Suciu, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 324 days.

(21) Appl. No.: 15/230,590

(22) Filed: Aug. 8, 2016

(65) Prior Publication Data

US 2018/0038315 A1     Feb. 8, 2018

(51) Int. Cl.
| | |
|---|---|
| *B64D 27/14* | (2006.01) |
| *F02K 3/00* | (2006.01) |
| *B64D 33/02* | (2006.01) |
| *B64D 33/04* | (2006.01) |
| *F02K 1/52* | (2006.01) |
| *B64D 35/04* | (2006.01) |
| *F02K 3/062* | (2006.01) |

(52) U.S. Cl.
CPC .............. *F02K 3/00* (2013.01); *B64D 27/14* (2013.01); *B64D 33/02* (2013.01); *B64D 33/04* (2013.01); *B64D 35/04* (2013.01); *F02K 1/52* (2013.01); *F02K 3/062* (2013.01); *F05D 2250/312* (2013.01)

(58) Field of Classification Search
CPC .. F02K 3/00; F02K 1/52; B64D 27/14; B64D 33/02; B64D 33/04; B64D 35/04
See application file for complete search history.

(56) References Cited

U.S. PATENT DOCUMENTS

| | | | |
|---|---|---|---|
| 3,054,577 A | * | 9/1962 | Wolf .................... B64D 27/12 244/110 B |
| 6,729,575 B2 | | 5/2004 | Bevilaqua |
| 6,918,244 B2 | | 7/2005 | Dickau |
| 7,665,689 B2 | | 2/2010 | McComb |

(Continued)

FOREIGN PATENT DOCUMENTS

| | | |
|---|---|---|
| WO | 2014109811 A2 | 7/2014 |
| WO | WO-2014109811 A2 * | 7/2014 ............... F02K 3/06 |

OTHER PUBLICATIONS

European Search Report for European Application No. 17185189.2, dated Dec. 14, 2017.

*Primary Examiner* — Justin M Benedik

(74) *Attorney, Agent, or Firm* — Carlson Gaskey & Olds, P.C.

(57) ABSTRACT

A gas turbine engine includes a core engine assembly including a compressor section communicating air to a combustor section where the air is mixed with fuel and ignited to generate a high-energy gas flow that is expanded through a turbine section. The turbine section is coupled to drive the compressor section. A propulsor section aft of the core engine is driven by the turbine section. An exhaust duct routing exhaust gases around the propulsor section. The exhaust duct includes an inlet forward of the propulsor section, an outlet aft of the turbine section and a passageway between the inlet and the outlet. An aircraft and exhaust duct are also disclosed.

18 Claims, 6 Drawing Sheets

(56) References Cited

U.S. PATENT DOCUMENTS

| | | |
|---|---|---|
| 7,753,311 B2 | 7/2010 | Gustafsson |
| 8,317,129 B1 | 11/2012 | Lawson et al. |
| 2013/0000273 A1* | 1/2013 | Roberge .................. F02C 3/073 60/226.1 |
| 2013/0062463 A1* | 3/2013 | Lord ...................... B64D 27/14 244/55 |
| 2014/0252161 A1* | 9/2014 | Gukeisen ............... B64D 27/14 244/60 |

* cited by examiner

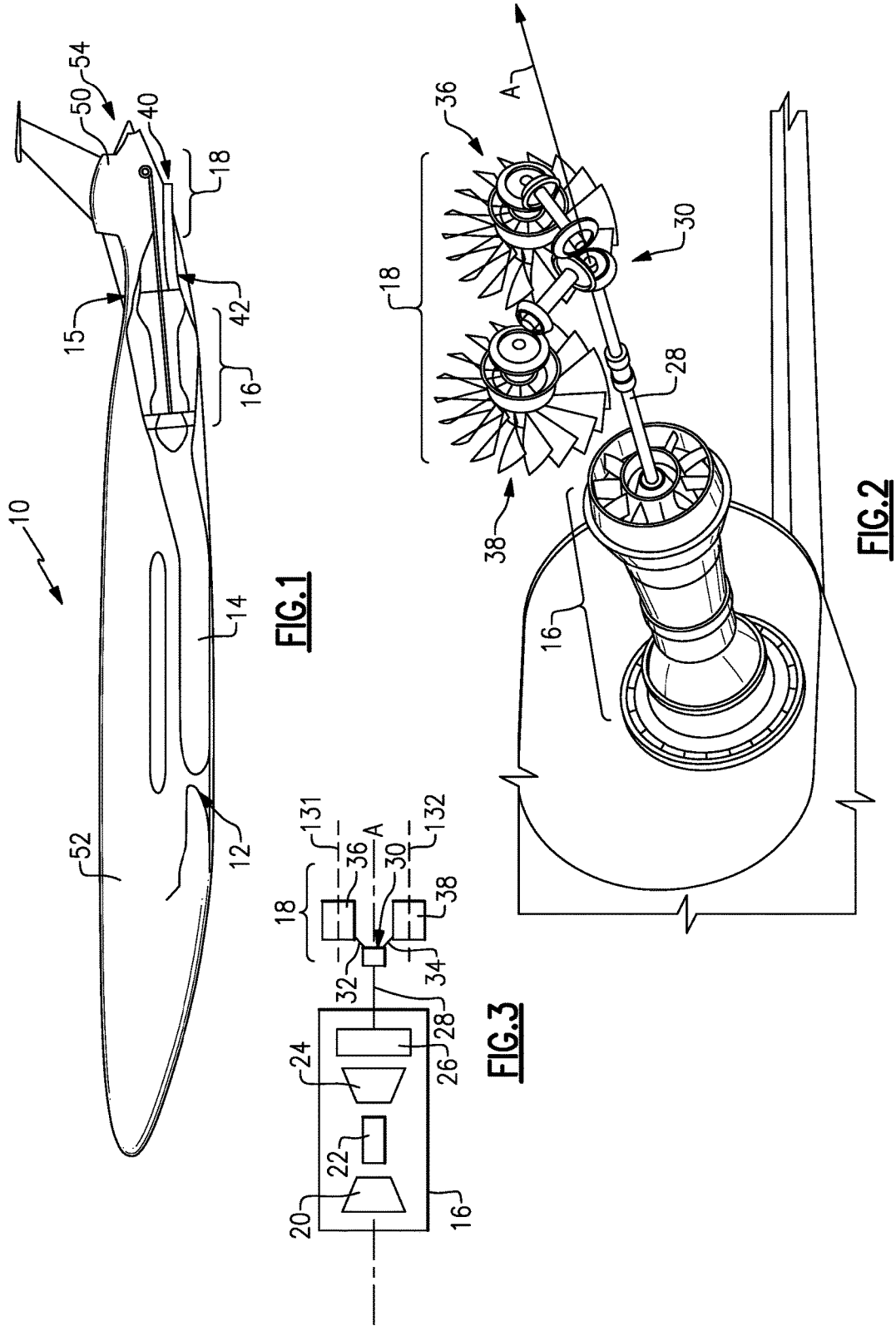

EXHAUST DUCT FOR TURBINE FORWARD OF FAN

STATEMENT REGARDING FEDERALLY SPONSORED RESEARCH OR DEVELOPMENT

This subject of this disclosure was made with government support under Contract No.: NND15AC56C awarded by NASA. The government therefore may have certain rights in the disclosed subject matter.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-energy exhaust gas flow expands through the turbine section to drive the compressor and the fan section.

A speed reduction device such as an epicyclical gear assembly driven by a core engine enables alternative placement of the gas turbine engine. The core components of the gas turbine engine such as the compressor, combustor and turbine can be imbedded within the aircraft body. A fan section may then be mounted in alternate locations such as at the rear of the aircraft body. In such a configuration the fan is aft of the core engine components and exhaust gases flow past the fan. It is not desirable to ingest the hot exhaust gases into the fan.

SUMMARY

In a featured embodiment, a gas turbine engine includes a core engine assembly including a compressor section communicating air to a combustor section where the air is mixed with fuel and ignited to generate a high-energy gas flow that is expanded through a turbine section. The turbine section is coupled to drive the compressor section. A propulsor section aft of the core engine is driven by the turbine section. An exhaust duct routing exhaust gases around the propulsor section. The exhaust duct includes an inlet forward of the propulsor section, an outlet aft of the turbine section and a passageway between the inlet and the outlet.

In another embodiment according to the previous embodiment, the outlet is aft of the propulsor section.

In another embodiment according to any of the previous embodiments, the inlet is transverse to an axis of the core engine and open 360 degrees about the axis of the core engine and the outlet defines an opening spaced radially apart from the engine axis.

In another embodiment according to any of the previous embodiments, the outlet is disposed below the engine axis and includes a width greater than a height.

In another embodiment according to any of the previous embodiments, the outlet includes a first outlet spaced apart from a second outlet and the passageway includes a first passageway between the inlet and the first outlet and a second passageway between the inlet and the second outlet.

In another embodiment according to any of the previous embodiments, the first outlet is disposed on one side of the propulsor and the second outlet is disposed on a second side of the propulsor.

In another embodiment according to any of the previous embodiments, includes a drive shaft driven by the turbine section of the core engine. The exhaust duct is routed such that exhaust gases are not in communication with the drive shaft.

In another embodiment according to any of the previous embodiments, includes a free turbine aft of the turbine section. The drive shaft is coupled to the free turbine.

In another embodiment according to any of the previous embodiments, includes a gearbox driven by the drive shaft. The propulsor includes at least one ducted fan driven by a propulsor shaft driven by the gearbox.

In another embodiment according to any of the previous embodiments, the core engine section is mounted within an aircraft fuselage and the propulsor section is disposed at an aft section of the aircraft fuselage.

In another featured embodiment, an aircraft includes a core engine assembly supported within an aircraft fuselage. The core engine assembly includes a compressor section communicating air to a combustor section where the air is mixed with fuel and ignited to generate a high-energy gas flow that is expanded through a turbine section. An air intake within the aircraft fuselage communicates air to the core engine assembly. A propulsor section is aft of the core engine assembly and mounted to an aft section of the aircraft fuselage. An exhaust duct routes exhaust gases from the turbine section around the propulsor section and through the aircraft fuselage. The exhaust duct includes an inlet opening forward of the propulsor section, an outlet aft of the propulsor section and a passageway between the inlet opening and the outlet.

In another embodiment according to the previous embodiment, the inlet opening is transverse to an axis of the core engine and open 360 degrees about the axis of the core engine and the outlet defines an opening spaced radially apart from the engine axis.

In another embodiment according to any of the previous embodiments, the outlet includes a first outlet spaced apart from a second outlet and the passageway includes a first passageway between the inlet opening and the first outlet and a second passageway between the inlet opening and the second outlet.

In another embodiment according to any of the previous embodiments, the first outlet is disposed on one side of the propulsor and the second outlet is disposed on a second side of the propulsor.

In another embodiment according to any of the previous embodiments, includes a drive shaft driven by the turbine section of the core engine. The exhaust duct is routed such that exhaust gases do not impinge on the drive shaft.

In another embodiment according to any of the previous embodiments, includes a gearbox driven by the drive shaft. The propulsor includes at least one ducted fan driven by a propulsor shaft driven by the gearbox.

In another featured embodiment, an exhaust duct routes exhaust from a turbine forward of a fan. The exhaust duct includes an inlet opening disposed proximate a turbine outlet. The inlet opening is disposed 360 degrees about an engine axis. A passageway is spaced apart from the engine axis and extends aft from the inlet opening. An outlet opening is disposed aft of a fan such that exhaust flow is routed away from the fan.

In another embodiment according to the previous embodiment, includes a split portion aft of the inlet opening splitting the passageway around the engine axis.

In another embodiment according to any of the previous embodiments, the outlet includes a rectangular opening aft of the fan and below the engine axis relative to the split portion.

In another embodiment according to any of the previous embodiments, the outlet includes a first outlet spaced apart from a second outlet and the passageway includes a first passageway between the inlet opening and the first outlet and a second passageway between the inlet opening and the second outlet.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 1 is a schematic view of an example aircraft including a partially embedded propulsion system.

FIG. 2 is an exploded view of the example propulsion system within the aircraft.

FIG. 3 is a schematic illustration of the example propulsion system embedded within the aircraft.

DETAILED DESCRIPTION

Figure 4:
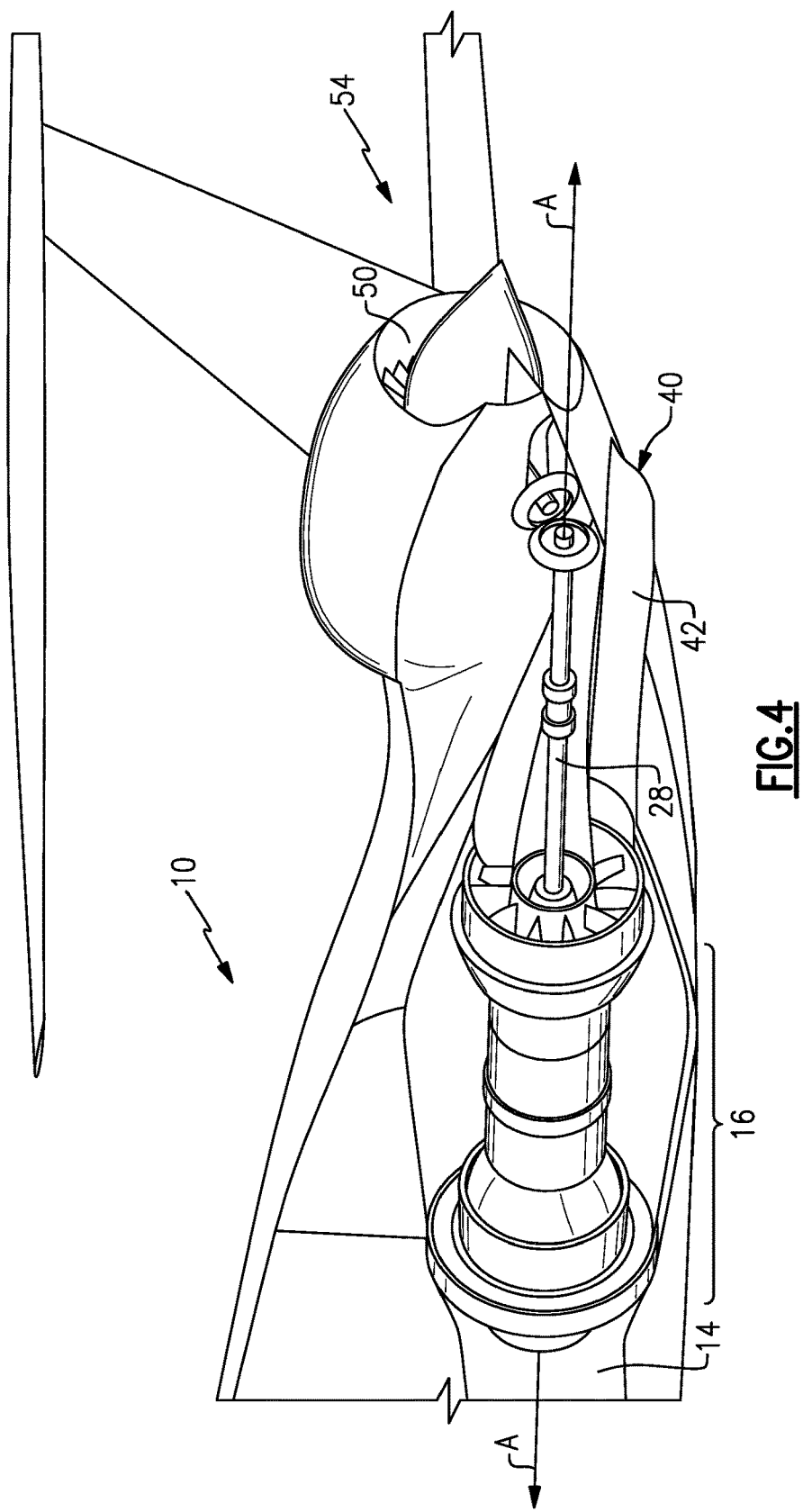
FIG. 4 is a partial cutaway view of the example propulsion system within the aircraft fuselage.

FIG. 1 schematically illustrates an aircraft 10 that includes an embedded propulsion system 15. The example propulsion system 15 includes a core engine 16 also referred to a gas generator that is embedded within the aircraft fuselage 52. The core engine 16 drives a propulsor 18 that is disposed at an aft end 54 of the aircraft fuselage 52. The example propulsor 18 comprises two fans 36, 38 disposed at the aft end 54. The core engine 16 is fed air through an air intake opening 12 and then through an internal inlet 14. The intake 12 is disposed forward of the core engine 16 and therefore the inlet 14 communicates the required air through the fuselage 52 to the core engine 16.

Referring to FIGS. 2 and 3 with continued reference to FIG. 1, the example core engine 16 includes a compressor section 20 that compresses incoming air and supplies that air to a combustor 22. In the combustor 22, gas is mixed with the air and ignited to generate a high energy exhaust flow that is expanded through a turbine section 24. In the disclosed core engine 16, a free or second turbine 26 is disposed aft of the turbine section 24. The free or second turbine 26 drives the propulsor 18 through a drive shaft 28. The drive shaft 28 along with the compressor 20, combustor 22 and turbine section 24 are disposed along a common engine axis A.

The propulsor 18 includes ducted fans 36 and 38 that rotate about separate axes B1, B2 that are spaced from the engine axis A. Because the fans 36, 38 are disposed aft of the core engine 16, the drive shaft 28 need not extended through the core engine 16. Accordingly, because the drive shaft 28 is not extending through the central portion of the engine, the entire core engine 16 may be reduced in size. The reduced size enables improved efficiencies.

The propulsor section 18 includes the first fan 36 and the second fan 38 driven by corresponding shafts 32 and 34 that are in turn driven by a gearbox 30. The drive shaft 28 driven by the free turbine 26 drives the gearbox 30. The fans 36 and 38 are therefore aft of the core engine 16 and thereby potentially exposed to exhaust gasses expelled from the turbine section 24. The example propulsion system 15 includes an exhaust duct 42 that routes harmful exhaust gases around the drive shaft 28, gearbox 30 and the propulsor 18.

Referring to FIG. 4 with continued reference to FIG. 1, the example exhaust duct 42 includes an exhaust outlet 40 disposed to one side of the propulsor section 18 to prevent incursion into the fans 36, 38. In this example, the exhaust outlet 40 is disposed below the fans 36 and 38.

Figure 5:
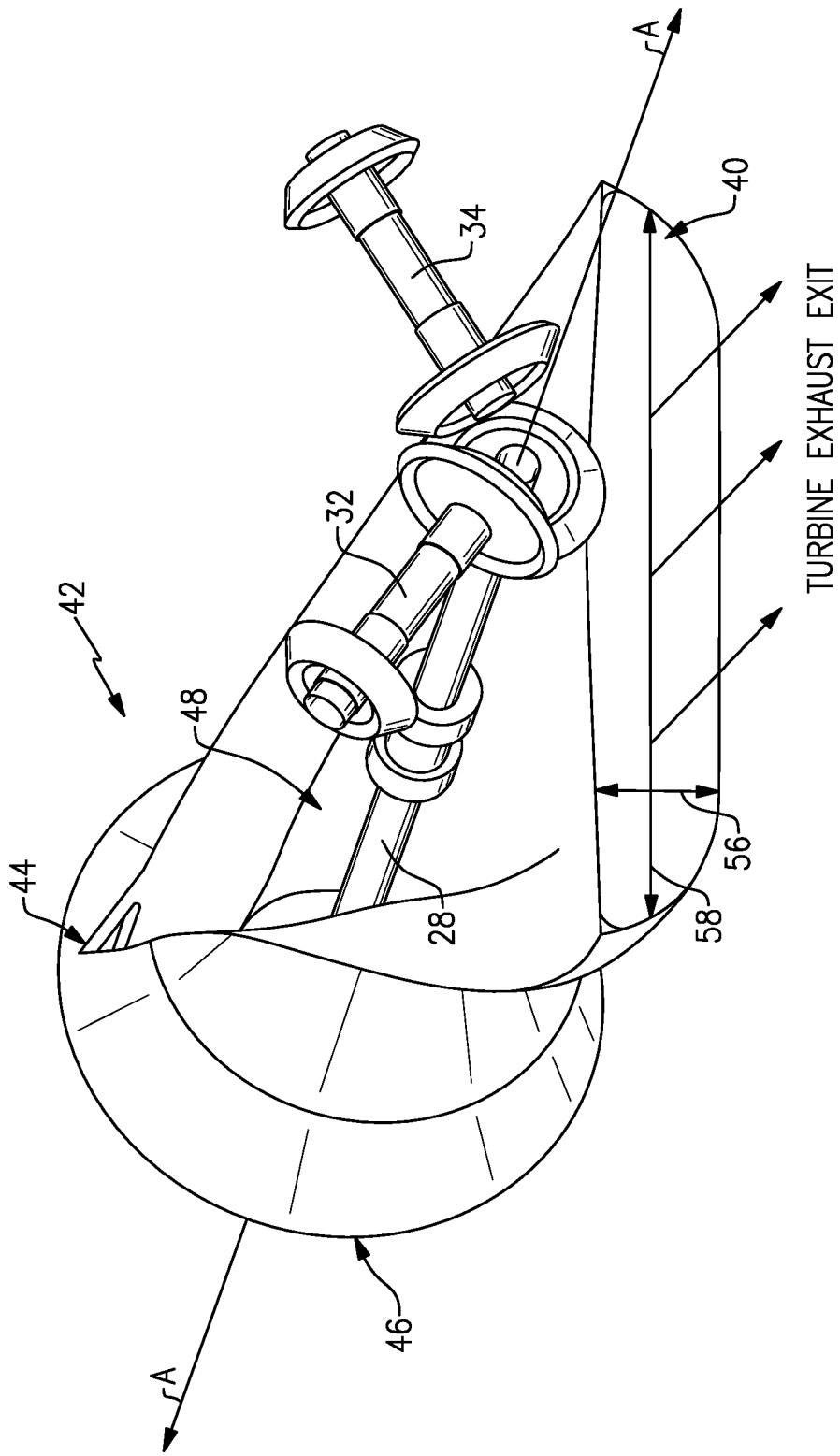
FIG. 5 is a perspective view of an example disclosed exhaust duct.
Figure 6:
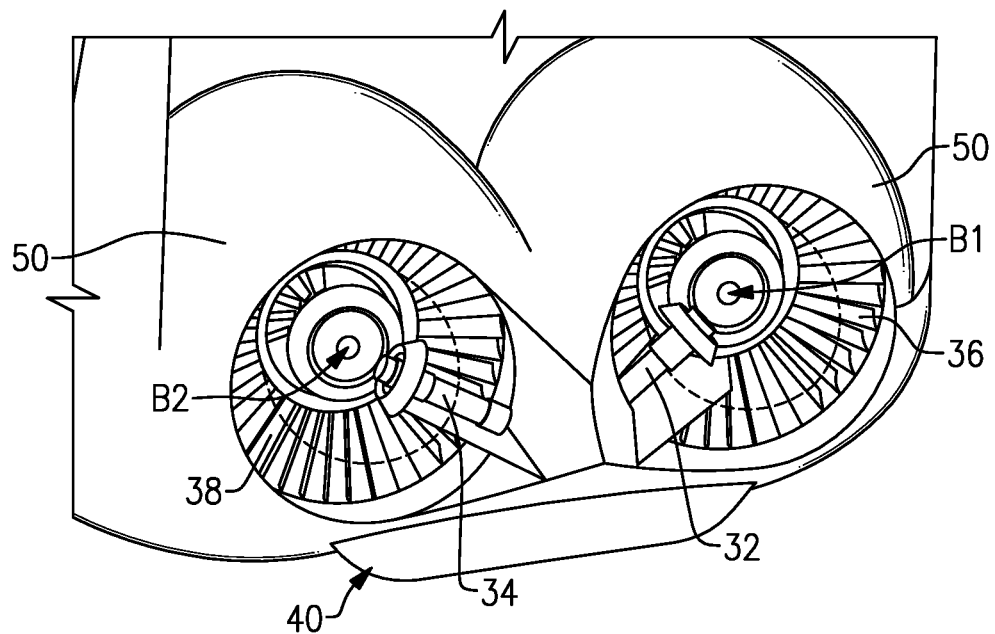
FIG. 6 is a rear view of an example exhaust outlet.
Figure 7:
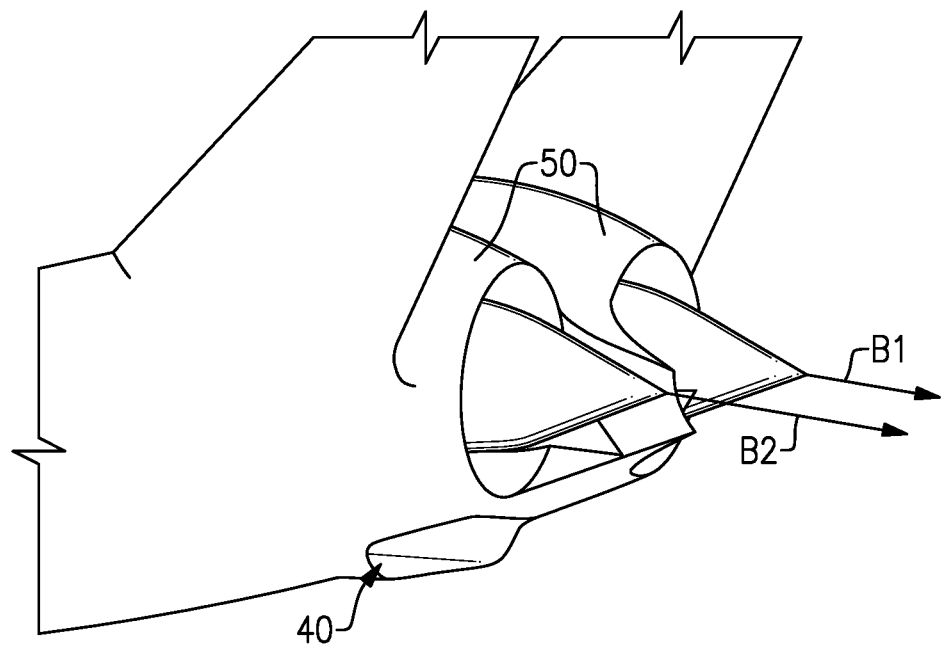
FIG. 7 is a side view of the example exhaust outlet.

Referring to FIGS. 5, 6 and 7 with continued reference to FIG. 4, the example exhaust duct 42 is illustrated without the surrounding aircraft fuselage and includes the exhaust outlet 40 that is disposed at the aft portion 54 of the aircraft 10. The duct 42 includes a forward intake opening 46. The forward intake opening 46 is an annulus disposed about the engine axis A with an outer diameter corresponding to the diameter of the free turbine 26. The duct 42 splits the annulus of the intake opening 46 at a split location 44 and wraps outwardly around the drive shaft 28. The duct 42 defines enclosed passages that extend around the drive shaft 28 and fan shafts 32 and 34. The duct 42 is therefore spaced away from the engine axis A aft of the split location 44.

The annulus of the opening 46 is split and wrapped from the split location 44 in a uniform curved duct that extends to the exhaust outlet 40. Accordingly, exhaust gasses are routed from the inlet 46 down to the bottom side of the propulsor 18 such that exhaust exiting the turbine section 24 is routed around and away from the fan ducts 50. The example exhaust outlet 40 is substantially rectangular and includes a height 56 substantially less than a width 58. The area provided by the outlet 40 is substantially equal to that of the inlet 46, but shaped differently to direct exhaust gasses base the propulsor 18.

Figure 10:
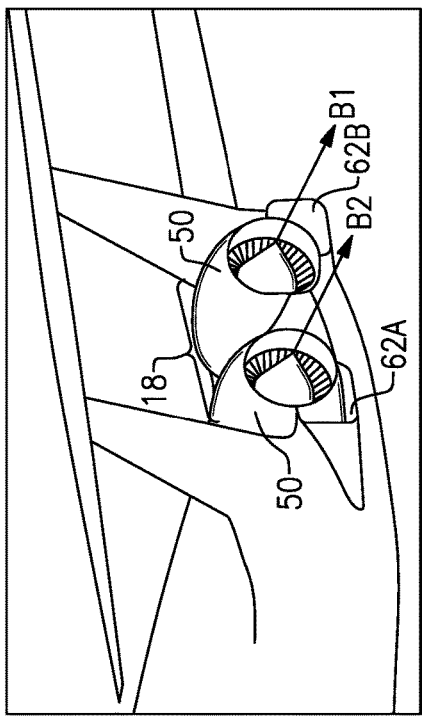
FIG. 10 is a rear view of the example exhaust duct outlets.
Figure 8:
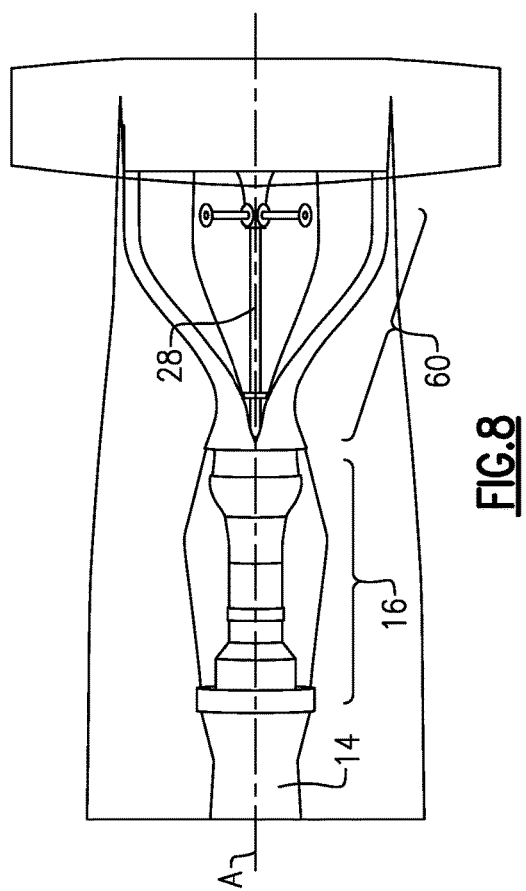
FIG. 8 is an overhead partial cutaway view of another example exhaust duct.
Figure 9:
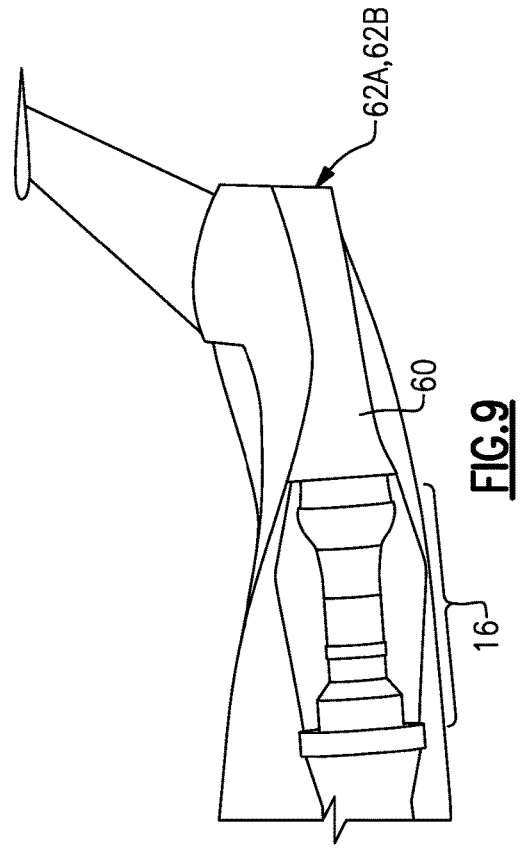
FIG. 9 is a side view of the example exhaust duct illustrated in FIG. 8.

Referring to FIGS. 8, 9 and 10, another exhaust duct 60 is illustrated that provides for the routing of exhaust gasses from the core engine 16 around the drive shaft 28 and away from the fan ducts 50. In this disclosed duct 60, the exhaust outlet is split into a first outlet 62a and a second outlet 62b that are each disposed on bottom and outward sides of the propulsor section 18.

Figure 11:
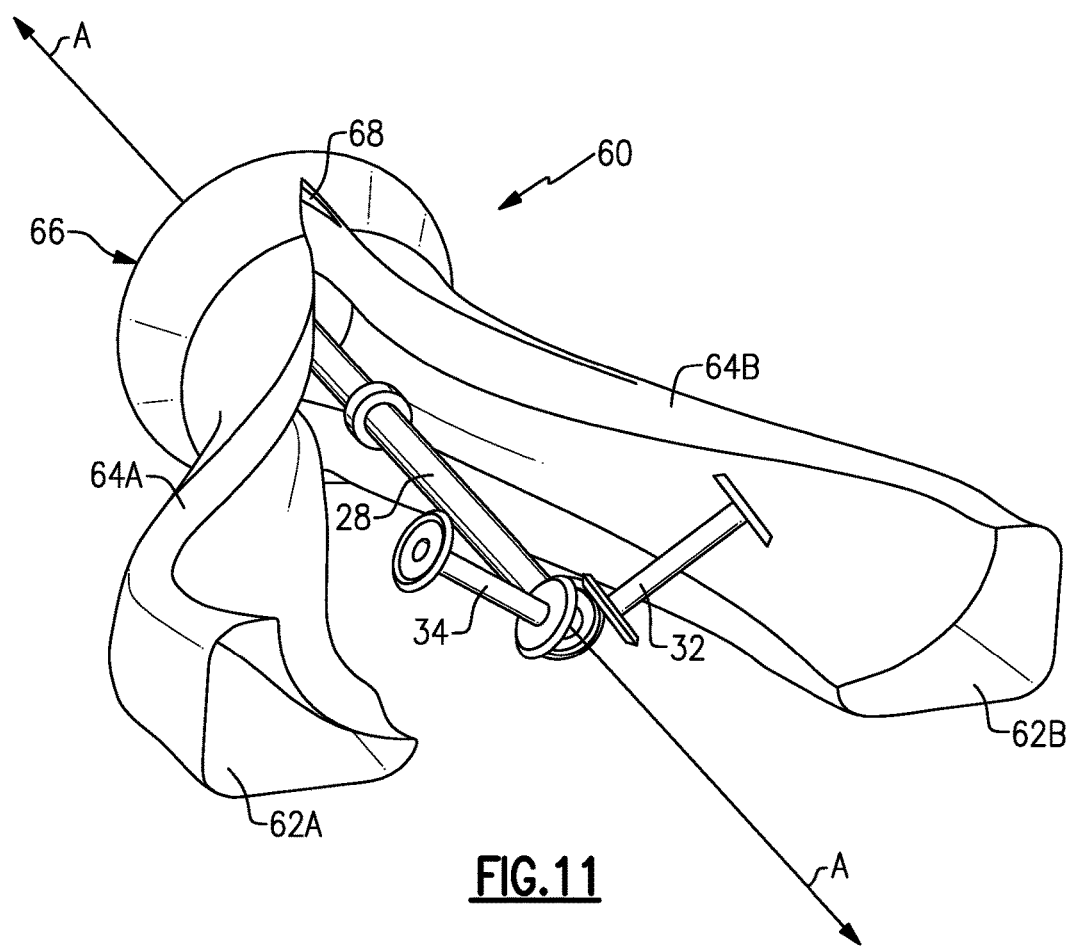
FIG. 11 is a perspective view of another example exhaust duct.

Referring to FIG. 11 with continued reference to FIGS. 8, 9 and 10, the example exhaust duct 60 includes an inlet 66 that is substantially an annulus disposed about the engine axis A like the previous exhaust duct and is split at a split point 68. At the split point 68 rather than continuing in a single duct, the duct is split into a first leg portion 64a and a second leg portion 64b. Each leg portion is a hollow duct that curves around the drive shaft 28 and the propulsor section 18. Each of the legs 64a and 64b provide a smooth conduit for exhaust gasses to be communicated to the outlets 62a and 62b on either side of the fans 36, 38 of the propulsor section 18.

Accordingly, the example exhaust duct configuration enable use of an embedded core engine with a free turbine by routing the exhaust gasses around the output drive shafts and fan ducts.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
a core engine assembly including a compressor section communicating air to a combustor section where the air is mixed with fuel and ignited to generate a high-energy gas flow that is expanded through a turbine section, wherein the turbine section is coupled to drive the compressor section;
a drive shaft driven by the turbine section of the core engine;
a propulsor section aft of the core engine driven by the drive shaft; and
an exhaust duct routing exhaust gases around the propulsor section, the exhaust duct including an inlet forward of the propulsor section, an outlet aft of the turbine section and a passageway between the inlet and the outlet, wherein the exhaust duct is routed such that exhaust gases are not in communication with the drive shaft.

2. The gas turbine engine as recited in claim 1, wherein the outlet is aft of the propulsor section.

3. The gas turbine engine as recited in claim 1, wherein the inlet is transverse to an axis of the core engine and open 360 degrees about the axis of the core engine and the outlet defines an opening spaced radially apart from the engine axis.

4. The gas turbine engine as recited in claim 3, wherein the outlet is disposed below the engine axis and includes a width greater than a height.

5. The gas turbine engine as recited in claim 1, wherein the outlet comprises a first outlet spaced apart from a second outlet and the passageway comprises a first passageway between the inlet and the first outlet and a second passageway between the inlet and the second outlet.

6. The gas turbine engine as recited in claim 5, wherein the first outlet is disposed on one side of the propulsor and the second outlet is disposed on a second side of the propulsor.

7. The gas turbine engine as recited in claim 1, including a free turbine aft of the turbine section, the drive shaft coupled to the free turbine.

8. The gas turbine engine as recited in claim 1, including a gearbox driven by the drive shaft, wherein the propulsor includes at least one ducted fan driven by a propulsor shaft driven by the gearbox.

9. The gas turbine engine as recited in claim 1, wherein the core engine section is mounted within an aircraft fuselage and the propulsor section is disposed at an aft section of the aircraft fuselage.

10. An aircraft comprising:
a core engine assembly supported within an aircraft fuselage, the core engine assembly including a compressor section communicating air to a combustor section where the air is mixed with fuel and ignited to generate a high-energy gas flow that is expanded through a turbine section;
an air intake within the aircraft fuselage communicating air to the core engine assembly;
a drive shaft driven by the turbine section of the core engine;
a propulsor section aft of the core engine assembly and mounted to an aft section of the aircraft fuselage, the propulsors section driven by the drive shaft; and
an exhaust duct routing exhaust gases from the turbine section around the propulsor section and through the aircraft fuselage, the exhaust duct including an inlet opening forward of the propulsor section, an outlet aft of the propulsor section and a passageway between the inlet opening and the outlet.

11. The aircraft as recited in claim 10, wherein the inlet opening is transverse to an axis of the core engine and open 360 degrees about the axis of the core engine and the outlet defines an opening spaced radially apart from the engine axis.

12. The aircraft as recited in claim 10, wherein the outlet comprises a first outlet spaced apart from a second outlet and the passageway comprises a first passageway between the inlet opening and the first outlet and a second passageway between the inlet opening and the second outlet.

13. The aircraft as recited in claim 12, wherein the first outlet is disposed on one side of the propulsor and the second outlet is disposed on a second side of the propulsor.

14. The aircraft as recited in claim 10, wherein the exhaust duct is routed such that exhaust gases do not impinge on the drive shaft.

15. The aircraft as recited in claim 14, including a gearbox driven by the drive shaft, wherein the propulsor includes at least one ducted fan driven by a propulsor shaft driven by the gearbox.

16. An exhaust duct for routing exhaust from a turbine forward of a fan, the exhaust duct comprising:
an inlet opening disposed proximate a turbine outlet, the inlet opening disposed 360 degrees about an engine axis;
a passageway spaced apart from the engine axis and extending aft from the inlet opening;
a split portion aft of the inlet opening splitting the passageway around the engine axis; and
an outlet opening disposed aft of a fan such that exhaust flow is routed away from the fan.

17. The exhaust duct as recited in claim 16, wherein the outlet comprises a rectangular opening aft of the fan and below the engine axis relative to the split portion.

18. The exhaust duct as recited in claim 16, wherein the outlet comprises a first outlet spaced apart from a second outlet and the passageway comprises a first passageway between the inlet opening and the first outlet and a second passageway between the inlet opening and the second outlet.

* * * * *